June 4, 1929.  J. G. DICK  1,715,823
SUGAR BEET HARVESTER AND TOPPER
Filed Jan. 25, 1926  5 Sheets-Sheet 2

Witnesses
C. L. McDonald
E. N. Lovewell

Inventor
John G. Dick
By
E. G. Siggers
Attorney

June 4, 1929.  J. G. DICK  1,715,823
SUGAR BEET HARVESTER AND TOPPER
Filed Jan. 25, 1926  5 Sheets-Sheet 3

Witnesses
C. L. McDonald
E. N. Lovewell

Inventor
John G. Dick
By E. G. Siggers
Attorney

June 4, 1929.    J. G. DICK    1,715,823
SUGAR BEET HARVESTER AND TOPPER
Filed Jan. 25, 1926    5 Sheets-Sheet 4

Witnesses
C. L. McDonald
E. N. Lovewell

Inventor
John G. Dick
By
E. G. Siggers
Attorney

Patented June 4, 1929.

1,715,823

UNITED STATES PATENT OFFICE.

JOHN G. DICK, OF CHINOOK, MONTANA.

SUGAR-BEET HARVESTER AND TOPPER.

Application filed January 25, 1926. Serial No. 83,628.

This invention relates to a sugar beet harvester and topper, which is adapted to loosen the soil around the beets, raise the latter from the ground and convey them upwardly and rearwardly between two opposed inclined belts, and then to present them to a topping knife in such a position as to sever the top from each beet at the proper point, all of this being done in a continuous operation as the machine travels along the beet row.

One of the principal objects of the invention is to provide a machine of this type with a suitable topping knife, and improved means for guiding and gaging each beet as it approaches the knife, so that all of the portion containing sugar is retained, while the useless portion is removed.

Another object of the invention is to provide improved means for engaging the beets as the dirt around them is loosened, and for lifting and delivering them to the gaging device in the proper position for the latter to fulfill its function.

The invention consists further in various details of construction and novel combinations of elements, the objects and advantages of which will be more fully explained in the following detailed description taken in connection with the accompanying drawings illustrating one embodiment thereof.

The main frame of the machine comprises side bars or rails 1, which are suspended at their rear ends by brackets 2 from the rear axle 3. Toward the middle of the machine, the side bars 1 are inclined upwardly and forwardly, as indicated at 4, and the front portions of the bars extend substantially horizontally, as shown at 5, and are integrally or otherwise connected by a transverse portion 6. A bolster 7 is secured by means of a bracket 8 to a pair of transverse supporting bars 9, which are arched in order to clear the tops of the beets as the machine straddles the row. Blocks 10 are secured between the ends of the bars 9, and in each of these blocks is a rotatably mounted vertical spindle 11, having its lower portion turned horizontally to form a front axle. The axle 12 is provided with a number of holes 13 for adjustably securing a collar or bearing 14, on which the front wheel 15 is mounted. Thus, the front wheels may be spaced apart a distance corresponding to the width between the rows. A bearing plate 16 surrounds the spindle 11 underneath the ends of the bars 9, and is formed with a clip 17, which is secured around the axle 12. The front wheels are provided with flanges 18, and are used for steering the machine.

The rear wheels 19 are provided with lugs 20, and are journaled on ratchet drums 21, which permit a differential movement of the wheels in turning. A plurality of holes 22 are provided in the axle 3, whereby the drums 21 may be secured at different distances apart, corresponding to the different widths between the rows.

The beet harvesting and handling mechanism is carried on an adjustable frame disposed between the side rails 1, and comprising side sills 23, each having a depending bracket 23a secured thereto in which the axle 3 is rotatably mounted, so that the frame carrying the harvesting mechanism may be tiltably adjusted about the axle 3.

Figure 6:
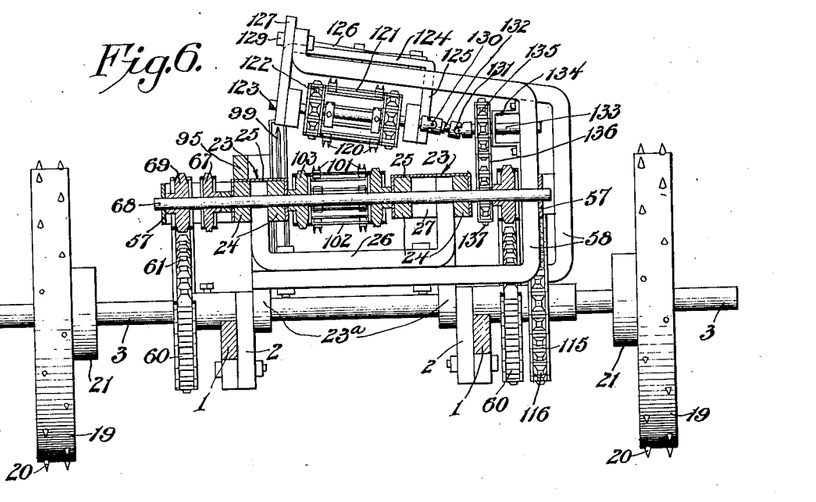
Figure 6 is a transverse section taken on the line 6—6 of Figure 2.
Figures 9, 10, 11, 12:
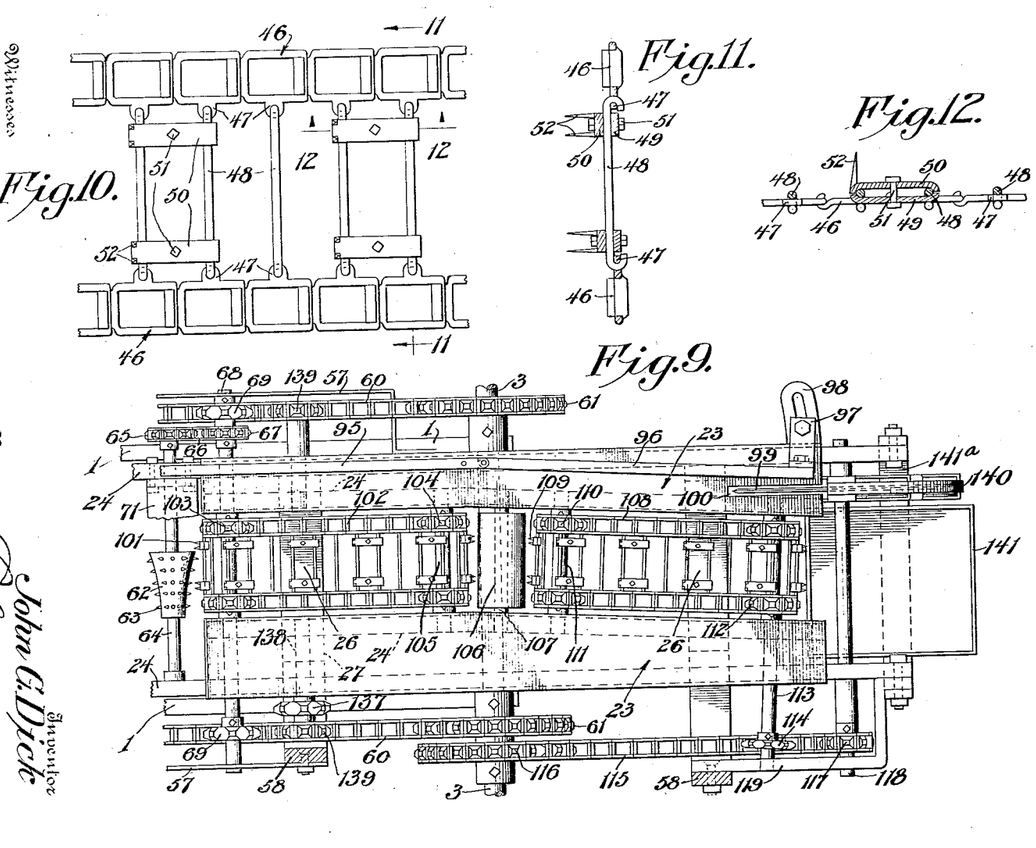
Figure 9 is a plan view of the gaging mechanism and parts associated therewith.
Figure 10 is a detail view of a portion of one of the beet conveyers.
Figure 11 is a section taken on the line 11—11 of Figure 10.
Figure 12 is a section taken on the line 12—12 of Figure 10.

Each sill 23, as shown in Figures 6 and 9, comprises two spaced beams 24, covered by sheet metal 25, so as to present a smooth upper surface. The sills are rigidly connected to each other at their ends by a bracket 26, the ends of which are secured between the bars 24 of the respective sills. A spacing block 27 is also secured between the bars 24 at the front end of the left-hand sill, and a similar block is secured at the rear end of the right-hand sill, and the inner bar 24 of each sill has its rear portion set at a slight angle to its front portion. This specific construction is designed for a special purpose in connection with the gaging of the beets in presenting them to the topping knife, as will be hereinafter explained.

The outer bars 24 extend from the forward ends of the sills in a downwardly inclined direction, as shown at 29. Above the parallel to the inclined portions 29 are similar bars 30, which are rigidly connected thereto by yokes 31, and by inclined brace bars 32. The bars 30 are rigidly connected to each other by an arcuate or arched bar 33, which permits the beet tops to pass beneath it. A driver's seat 34 is supported on the side bars 5. For supporting the tiltable frame in adjusted position, a notched quadrant 35 is secured to each side bar 5, and cooperating with this quadrant, within easy reach of the driver, is a hand lever 36, the lower end of which is connected to a link 37 pivoted on a bracket 38, which is secured to the arcuate bar 33. A plurality of holes 39 are formed in each of the links 37, so as to increase the range of adjustment.

The beets are dislodged from the ground by the use of plows 40, having their shanks 41 secured to the bars 30, and having rearwardly and upwardly extending prongs 42 for lifting the beets as soon as they are loosened from the ground.

Figure 3:
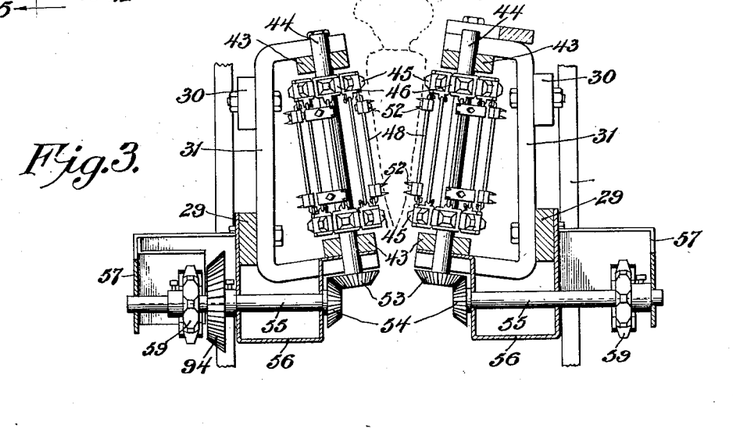
Figure 3 is a transverse section taken on the line 3—3 of Figure 2.

Pairs of upper and lower rails 43 are secured to the yokes 31, and shafts 44 are rotatably supported in the front and rear ends of the rails. Sprocket wheels 45 are secured to each shaft 44 and carry elevating conveyers, which comprise sprocket chains 46. The links of the sprocket chains, as shown in Figures 10 to 12, are formed with opposed ears 47 which are connected by rods 48. Certain of these rods are connected in pairs by clamping members 49 and 50, which are held together by bolts 51, and the inner clamping member 50 is formed with inwardly projecting prongs 52 adapted to engage a beet. The yokes 31 are so arranged that the shafts 44 are inclined forwardly and upwardly, and each pair of shafts diverges upwardly, as shown in Figure 3, so that the conveyers carried by the sprocket wheels 45 diverge from their lower edges to their upper edges, and carry the beets between them toward the rear of the machine and at the same time elevate them.

For driving these elevating conveyers, the rear shafts 44 are provided at their rear ends with beveled gears 53. Each of these beveled gears is driven by a beveled gear 54, carried by a horizontal transverse shaft 55 which is mounted in a bracket 56 secured to the rails 29 and 43, and the outer end of the shaft 55 is journaled in a bracket 57. The bracket 57, at the right hand side of the machine, is secured to the corresponding rail 29 and sill 23, while the bracket 57 at the left hand side of the machine, is secured to the corresponding rail 29 and the foremost one of two yokes 58, which are supported by the brackets 26. The shaft 55 is driven by means of a sprocket wheel 59 secured near its outer end and connected by a sprocket chain 60 to a sprocket wheel 61 secured to the rear axle 3.

As each beet is delivered from between the chains 46, it lower end strikes a concave roller or roll 62, which is tapered from its right end toward the left, and is provided with spurs 63. The roller 62 is secured to a shaft 64, which is adapted to rotate, as indicated by the arrow in Figure 7. For driving the shaft 64, a sprocket wheel 65 is secured to its outer end, and is connected by a sprocket chain 66 to a sprocket wheel 67 secured on a transverse shaft 68, which is journaled in the sills 23. The shaft 68 is driven by sprocket wheels 69, which are engaged by the outer faces of the sprocket chains 60.

Figure 7:
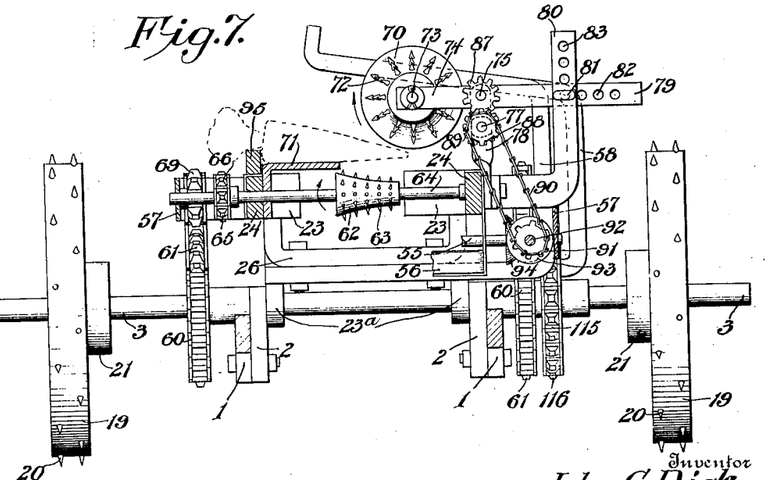
Figure 7 is a transverse section taken on the line 7—7 of Figure 1.

Each beet, as it is delivered rearwardly onto the roll 62, is engaged near its crown by a tipping roller 70, which rotates in the direction indicated by the arrow in Figure 7, and tips the beet laterally onto a shelf 71 with the tops hanging over the outer side of the adjacent sill 23. The roll 70 has radial spurs 72, and its surface is concave with its rear end diverging, so that the beet will fall laterally and not rearwardly.

The roll 70 is mounted on a shaft 73, which is journaled in the arms of a fork 74. This fork is pivotally supported on a shaft 75, rotatably mounted in the upper ends of links 76, which are mounted at their lower ends on a shaft 77 journaled in brackets 78 secured to the adjacent side of the rail 24. The outer end portion 79 of the fork 74 extends between two brackets 80 also secured to the adjacent rail 24, and the fork is secured in adjusted position by a pin 81. The stem 79 of the fork is provided with a plurality of holes 82, so that the roll 70 may be adjusted horizontally as the links 76 are swung about the shaft 77 as an axis, and the brackets 80 are also provided with a plurality of holes 83, so that the fork 74 may be adjusted about the shaft 75 as an axis to vary the height of the roll 70. This vertical and lateral adjustment of the roll 70 is for the purpose of adjusting it to the prevailing size of the beets in the field where the machine is operating.

For rotating the roll 70, its shaft 73 is extended rearwardly beyond the fork 74 and provided with a sprocket wheel 84, which is connected by a sprocket chain 85 to a sprocket wheel 86 secured to the shaft 75. The shaft 75 has a spur gear 87 at its front end, meshing with a spur gear 88 secured to the shaft 77. Secured also to the shaft 77 in front of the spur gear 88 is a sprocket wheel 89, which is connected by a sprocket chain 90 to a sprocket wheel 91 secured to a stub shaft 92 journaled in the bracket 57. Secured to the rear end of the stub shaft 92 is a beveled gear 93 meshing with a beveled gear 94, which is secured to the shaft 55, the latter being driven directly from the axle 3, as heretofore explained.

The beet, as it falls upon the shelf 71 lies with its crown adjacent a gage bar 95, which is secured near the outer edge of the right-hand sill 23, and has a hinged rear portion 96. The free end of this hinged portion has an ear 97 secured thereto, which is adjustably connected to a slotted bracket 98 secured to the rear end of the sill. The beet as it is carried rearwardly over the smooth surface of the sill 23, gradually works its way outwardly, bringing the crown against the hinged portion 96 of the gage bar, and the latter is adjusted according to the size and shape of the beets being harvested, so that the beet is engaged by the circular cutter 99 at the proper point to remove the tops, leaving only the portion containing the sugar. The cutter 99 is disposed in a slot 100 in the rear end of the sill 23.

From the shelf 71, the beets are conveyed rearwardly over the sills 23, and into engagement with the adjustable portion 96 of the gage bar, and against the cutter 99 by a system of conveyers, the detailed construction of which is similar to that of the elevator conveyers carried by the sprocket wheels 45. The beets, as they are tipped over, are engaged by the prongs 101 carried by the conveyer 102, the upper flight of which travels rearwardly over sprocket wheels 103 secured to the shaft 68, and sprocket wheels 104 secured to a shaft 105 journaled in the sills 23 near the middle thereof. At the rear end of the conveyer 102 is an idler roller 106 mounted on a shaft 107 journaled in the sills 23. Behind the roller 106, the inner faces of the sills 23 are inclined laterally, and between them is a conveyer 108 carrying prongs 109, which receive the beets and convey them rearwardly from the roller 106. The conveyer 108 is mounted on sprocket wheels 110 secured to a shaft 111 journaled in the sills 23, and sprocket wheels 112 secured to a shaft 113, journaled in the rear ends of the sills 23. The shaft 113 is extended at one side beyond the sill, and has a sprocket wheel 114 secured thereto, which engages the outer surface of a sprocket chain 115 driven from a sprocket wheel 116 secured to the axle 3. The sprocket chain 115 also passes around a sprocket wheel 117 secured to the transverse shaft 118, which is journaled in the rearwardly projecting ends of the bars 24 and carries the cutter 99. The outer ends of the shafts 113 and 118 are supported by a bracket 119, which is secured to the rearmost yoke 58 and the rear end of the adjacent bar 24.

Figures 1, 8:
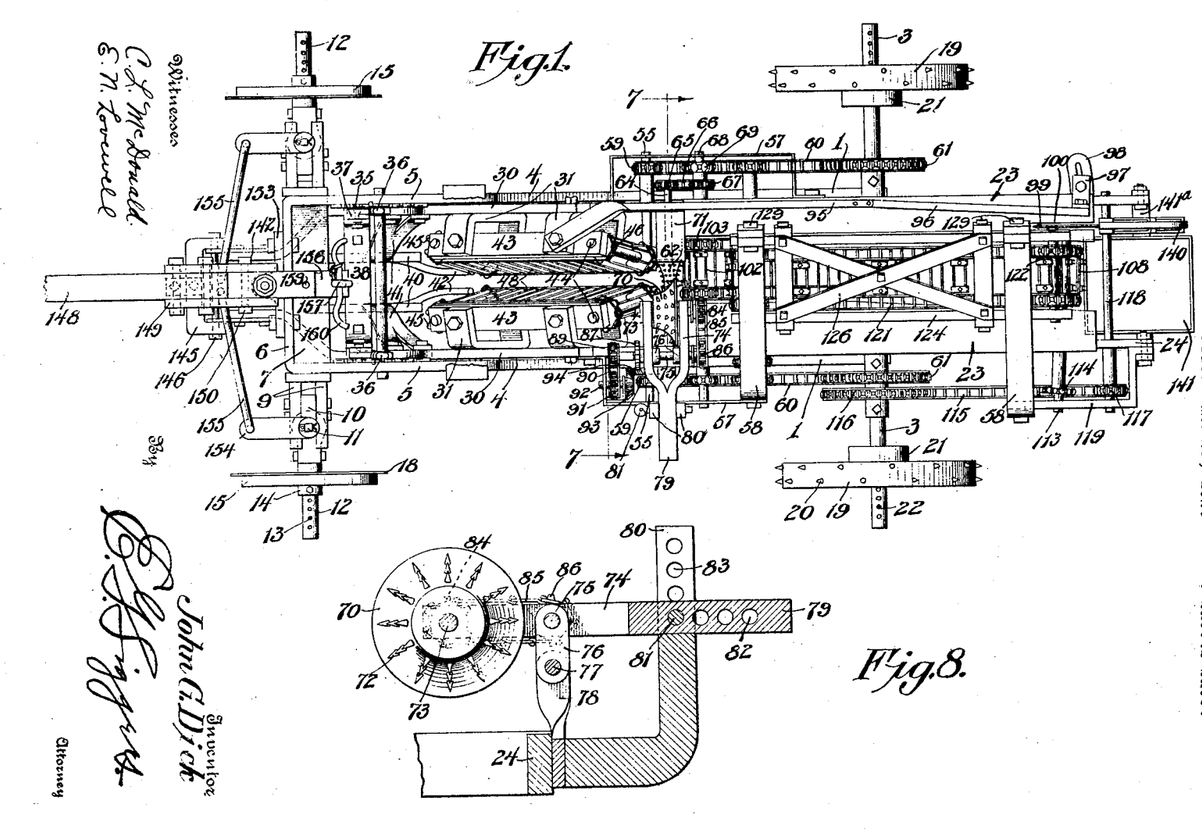
Figure 1 is a plan view of a machine constructed according to the invention.
Figure 8 is a sectional view of the beet tipping mechanism on an enlarged scale.
Figure 2:
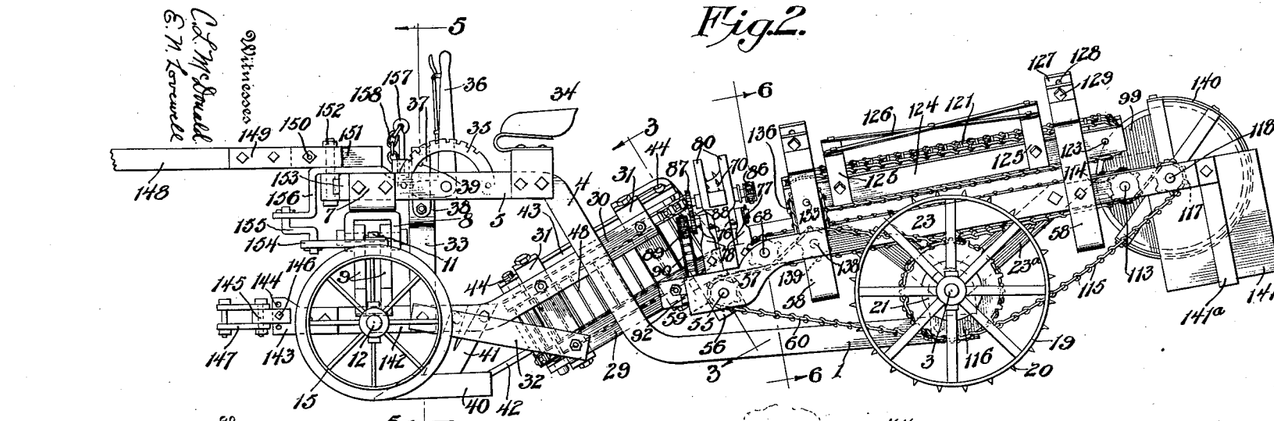
Figure 2 is a side elevation thereof.
Figure 4:
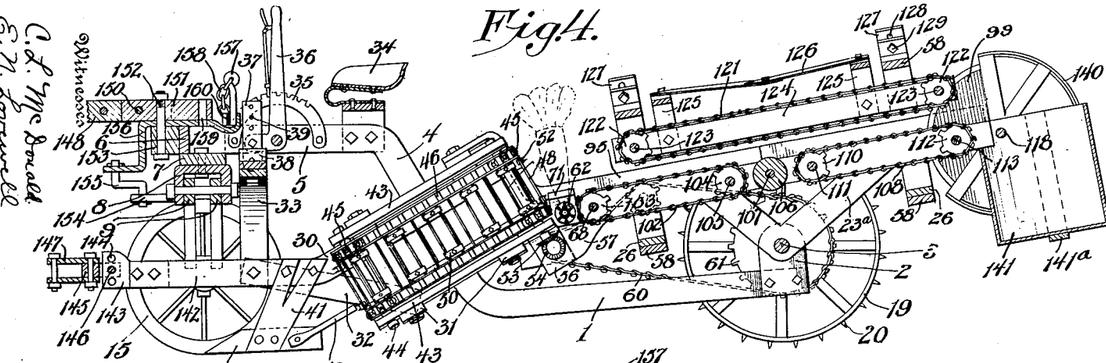
Figure 4 is a vertical longitudinal section.
Figure 5:
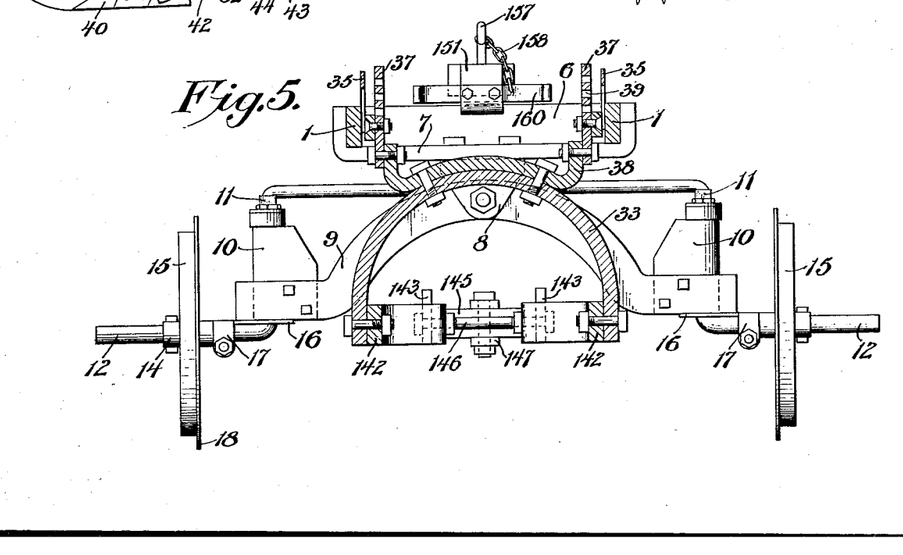
Figure 5 is a transverse section taken substantially on the line 5—5 of Figure 2.

The conveyance of the beets rearwardly over the conveyers 102 and 108, and the positioning of the same with respect to the gage bar 96 and the cutter 99 are assisted by the prongs 120 on an overhanging conveyer 121, best shown in Figures 2, 4 and 6. The conveyer 121 travels over sprocket wheels 122 secured to shafts 123, journaled respectively in the front and rear ends of a frame 124, the side rails of which are held in spaced relation by yokes 125 connected by braces 126. The frame 124 has upstanding arms 127 secured to one side rail, and provided with slots 128 which receive bolts or pins 129 secured in the upper ends of yokes 58, so that the frame 124 has a floating support permitting the conveyer 121 to move up and down, and to rest upon the beets as they pass rearwardly. The front shaft 123 is positively driven through the medium of gimbal joints 130 and 131, and a telescopic shaft 132, which connect it to a shaft 133 journaled in the front yoke 58 and a bracket 134 secured thereto. The shaft 133 has a sprocket wheel 135 secured thereto, which is connected by a sprocket chain 136 to a sprocket wheel 137 mounted on a stub shaft 138, the latter being driven by a sprocket wheel 139, over which the sprocket chain 60 passes. From Figure 6 it will be noted that the overhanging conveyer 121 is so mounted that it has a lateral inclination, and the beets, which are somewhat tapered, will gradually work toward the gage bar 96 as they travel rearwardly, and when the gage bar is properly adjusted, each beet will reach the cutter 99 in exactly the right position for the top to be cut therefrom. The rear end of the cutter is protected by a guard 140, and a box 141 is supported by a bracket 141ª from the rear ends of the rails 24, in position to receive the beets as they drop from the conveyer 108.

It is preferred to draw the machine over the field by draft horses, the draft being applied to the tiltable frame, which carries the harvesting mechanism. To this end, the rails 30 are extended forwardly in a substantially horizontal direction, as shown at 142, and have plates 143 secured to their front ends, and provided with series of holes 144 for adjustably connecting a yoke 145, thereto by means of a transverse bolt or rod 146. A clevis 147 is pivotally connected to the yoke 145, and to this clevis is attached the spreader bar which carries the whiffle trees.

A tongue 148 has side plates 149 rigidly connected to its rear end, and these side plates are connected by a horizontal pivot bolt 150 to a tongue support 151, which is connected by a king bolt 152 to a bracket 153, secured to the front rail 6 of the main frame.

For steering the machine, forwardly extending levers 154 are non-rotatably connected to the upper ends of the spindles 11, and the forward ends of these levers are connected by links 155 to a steering bar 156, which is pivotally mounted on the king bolt 152. A pin 157 is connected by a chain 158 to the frame, and may be inserted in a hole 159 in the rear end of the tongue to connect the latter to the steering bar 156, so that the machine will normally be steered by the draft animals through the medium of the tongue 148. This method of steering, however, is not sufficiently accurate to be used while the machine is in operation, since, in order to harvest the beets efficiently, the plows 40 must be accurately guided, so that the beets will enter exactly midway between them. When the machine is in operation, therefore, the pin 157 is pulled out of the hole 159, and the steering bar is actuated by the feet of the driver engaging the foot rest 160 secured to the rear end of the steering bar.

From the foregoing description, it will be seen that the machine is adapted to harvest sugar beets and similar root crops, and may be adjusted in accordance with the prevailing size and shape of the beets and their position in the ground. The plows 40 may be adjusted to any depth desired by means of the lever 36 and its adjustable connection with the yoke 33. The tipping roller 70 is capable of adjustment vertically and laterally, so that it will properly engage the beets and deliver them in transverse horizontal position to the rearwardly traveling conveyer 102. The rear portion of the gage bar 96 is also adjustable, and the floating conveyer 121 coacts with the conveyers 102 and 108 to work the crown of the beet up against the gage bar 96, and present the same to the cutter 99 in proper position to be topped.

While I have shown and described in detail the specific construction of one form in which the invention may be embodied, it is apparent that the same may be modified to a considerable extent without any material departure from the salient features of the invention as herein claimed.

What is claimed is:—

1. In a beet harvester, the combination of a main frame having front and rear supporting wheels, a supplemental frame mounted for pivotal adjustment on the rear axle, and with its front end extending below the front end of the main frame and in advance thereof; beet pulling means carried by the supplemental frame near the front end thereof; means in rear of the beet pulling means for elevating, gaging and topping the beets; means connected between the main frame and the supplemental frame to hold the latter rigidly in adjusted position; and draft elements attached to the front end of the supplemental frame.

2. In a beet harvester, the combination of a main wheel-supported frame having side rails rigidly connected together, a supplemental frame pivotally mounted between the side rails, plows, elevating, gaging and topping mechanism mounted on the supplemental frame, an arched bar at the front end of the supplemental frame adapted to straddle a row of beet tops, a pair of spaced links pivoted to and extending upwardly from the arched bar, a pair of levers and co-operating quadrants mounted on the main frame, and means for adjustably connecting the levers to said upwardly extending pivoted links to secure a wide range of adjustment for the supplemental frame, and draft elements attached to the front end of the supplemental frame.

3. In a beet harvester, the combination of a downwardly and forwardly inclined frame having plows at the front end for loosening the soil about the beets, means in rear of the plows for elevating the beets while maintaining them in upright position, longitudinal sills in rear of the elevator, a gage bar at the side of one sill, a topping knife at the rear end thereof, rotary means for tipping the beets laterally toward the gage bar, and means for conveying them rearwardly and at the same time gradually urging them against the gage bar.

4. In a beet harvester, a frame having means at its front end for dislodging the beets from the ground and elevating them while maintaining them in upright position, longitudinal sills in rear of the elevator, a gage bar at the outer edge of one sill and having a rear portion hinged and laterally adjustable, a topping knife at the rear end of the hinged portion, rotary means for tipping the beets laterally toward the gage bar, and means for conveying them rearwardly over the sills and at the same time gradually urging them against the gage bar.

5. In a beet harvester, the combination of a downwardly and forwardly inclined frame having means at its forward end for dislodging the beets from the ground and elevating them while maintaining them in upright position, a rearwardly travelling conveyer in rear of the elevator, a gage bar located laterally of said conveyer, a topping knife at the rear end of the gage bar, means for delivering the beets from the elevator to said conveyer with their crowns directed toward the gage bar, and an overhanging conveyer so arranged that the faces of the two conveyers diverge toward the side nearest to the gage bar, whereby the crowns of the beets gradually work toward the gage bar as the beets are carried rearwardly.

6. In a beet harvester, a downwardly and forwardly inclined frame having plows at the front end for loosening the soil about the beets, means in rear of the plows for elevating the beets while maintaining them in upright position, longitudinal sills in rear of the elevator, a gage bar at the outer edge of one sill and having a rear portion hinged and laterally adjustable, a topping knife at the rear end of the hinged portion, means for tipping the beets laterally toward the gage bar as they are delivered from the elevator, a rearwardly travelling conveyer on which the beets are carried over the sills toward the topping knife, and an overhanging conveyer so arranged that the faces of the two conveyers diverge toward the side nearest the gage bar, whereby the crowns of the beets gradually work toward the gage bar as the beets are conveyed rearwardly.

7. In a beet topper, the combination of a topping knife, longitudinal sills in front of the knife, a gage bar at the outer edge of one sill, a conveyer for supporting and conveying the beets toward the knife, and an overhanging conveyer floatingly supported in a position to engage the upper sides of the beets during their rearward travel and to gradually urge their crowns against the gage bar.

8. In a beet topper, the combination of a topping knife, longitudinal sills in front of the knife, a gage bar at the outer edge of one sill, a conveyer for conveying the beets over the sills toward the knife, said gage bar having a hinged rear portion which is adjustable toward or away from the conveyer, means for delivering the beets to the conveyer with their crowns disposed toward the gage bar, and an overhanging conveyer floatingly supported in a position to engage the upper sides of the beets during their rearward travel and to gradually urge their crowns against the gage bar.

9. In a beet topper, the combination of means for elevating the beets while holding them in upright position, a transversely disposed roll for engaging the bottom ends of the beets as they are delivered from the elevator, a longitudinally disposed tipping roll above the transverse roll for tipping the beets laterally, and a rearwardly travelling conveyer for receiving the beets as they are tipped.

10. In a beet topper, the combination of means for elevating the beets while holding them in upright position, a transversely disposed roll for engaging the bottom ends of the beets as they are delivered from the elevator, a longitudinally disposed tipping roll above the transverse roll for tipping the beets laterally, said tipping roll being vertically and laterally adjustable to adapt it to beets of different sizes, and a rearwardly travelling conveyer for receiving the beets as they are tipped.

11. In a beet topper, the combination of means for elevating the beets while holding them in upright position, a transversely disposed tapered roll for engaging the bottom ends of the beets as they are delivered from the elevator, a longitudinally disposed tipping roll above the smaller end of the transverse roll for tipping the beets laterally, said tipping roll being tapered in the direction of its forward end, and a rearwardly travelling conveyer for receiving the beets as they are tipped.

12. In a beet topper, the combination of means for elevating the beets while holding them in upright position, a transversely disposed tapered roll for engaging the bottom ends of the beets as they are delivered from the elevator, a longitudinally disposed tipping roll above the smaller end of the transverse roll for tipping the beets laterally, said tipping roll being vertically and laterally adjustable to adapt it to beets of various sizes and tapered in the direction of its forward end, and a rearwardly travelling conveyer for receiving the beets as they are tipped.

13. In a beet topper, the combination of means for elevating the beets while holding them in upright position, a transversely disposed roll for engaging the bottom ends of the beets as they are delivered from the elevator, a longitudinally disposed tipping roll above the transverse roll for tipping the beets laterally, a fork in which the tipping roll is mounted, upright pivoted links in which the fork is pivoted so that the fork and tipping roll may be adjusted vertically or transversely to correspond to the size of the beets, means for securing the fork in its adjusted position, and a rearwardly travelling conveyer for receiving the beets as they are tipped.

14. In a beet topper, the combination of means for elevating the beets while holding them in upright position, a transversely disposed tapered roll for engaging the bottom ends of the beets as they are delivered from the elevator, a longitudinally disposed tipping roll above the smaller end of the transverse roll for tipping the beets laterally, said tipping roll being tapered toward its forward end, a fork in which the tipping roll is mounted, upright pivoted links in which the fork is fulcrumed so that the fork and tipping roll may be adjusted transversely or vertically to correspond with the size of the beets, and a rearwardly travelling conveyer for receiving the beets as they are tipped.

15. In a beet topper, the combination of means for elevating the beets while holding them in upright position, a transversely disposed roll for engaging the bottom ends of the beets as they are delivered from the elevator, a longitudinally disposed tipping roll above the transverse roll for tipping the beets laterally, means for positively rotating the transversely disposed roll so that its upper side moves rearwardly, a rearwardly travelling conveyer for receiving the beets as they are tipped, a gage bar at one side of said conveyer, and means for positively rotating the tipping roll so that its lower side moves toward said gage bar.

16. In a beet topper, the combination of means for elevating the beets while holding them in upright position, a transversely disposed tapered roll for engaging the bottom ends of the beets as they are delivered from the elevator, a longitudinally disposed tipping roll above the smaller end of the transverse roll for tipping the beets laterally, said tipping roll being tapered toward its forward end, means for positively rotating the transversely disposed roll so that its upper side moves toward the larger end of the tipping roll, means for positively rotating the tipping roll so that its lower side moves toward the larger end of the transversely disposed roll, and a rearwardly travelling conveyer for receiving the beets as they are tipped.

17. In a beet topper, the combination of means for elevating the beets while holding them in upright position, a transversely disposed tapered roll for engaging the bottom ends of the beets as they are delivered from the elevator, a longitudinally disposed tipping roll above the smaller end of the transverse roll for tipping the beets laterally, said tipping roll being tapered toward its forward end, a fork in which the tipping roll is journaled, upright pivoted links in which the fork is pivotally mounted so that the fork and tipping roll may be adjusted vertically or transversely to correspond to the size of the beets, means for positively rotating the transversely disposed roll so that its upper side moves toward the larger end of the tipping roll, means for positively rotating the tipping roll so that its lower side moves toward the larger end of the transversely disposed roll, and a rearwardly travelling conveyer for receiving the beets as they are tipped.

18. In a beet topper, the combination of a frame having a pair of longitudinally spaced sills with a gage bar mounted at the outer edge of one of them, a conveyer between the sills and adapted to convey beets rearwardly over the sills with the crowns of the beets disposed toward the gage bar, yokes overhanging the sills, a frame having a vertically slidable connection with the yokes, an overhanging conveyer mounted on the slidable frame and adapted to overhang the beets in a laterally inclined position so as to bear upon the beets and cause their crowns to bear against the gage bar, and a topping knife at the rear end of the gage bar.

In testimony, that I claim the foregoing as my own, I have hereto affixed my signature.

JOHN G. DICK.